July 13, 1937.  G. N. COUGHLAN  2,087,140

STRING BEAN PREPARING INSTRUMENT

Original Filed March 21, 1934

INVENTOR
Gerald N. Coughlan.
BY
Dyke & Schainer
ATTORNEYS

Patented July 13, 1937

2,087,140

UNITED STATES PATENT OFFICE 2,087,140

STRING BEAN PREPARING INSTRUMENT

Gerald Noel Coughlan, East Orange, N. J.

Original application March 21, 1934, Serial No. 716,594. Divided and this application August 3, 1935, Serial No. 34,642

4 Claims. (Cl. 146—170)

This application is a division of my prior application which has matured into Patent No. 2,010,222, issued on August 6, 1935.

The subject of this invention is a trimming instrument particularly for topping, stringing, and slicing string beans in preparing them for cooking.

String beans, and even to a considerable degree the so-called stringless beans, have woody indigestible tips and side strings. When these are left on the beans they make them relatively unpleasant to eat. The most desirable way to serve string beans is topped, strung, and sliced endwise, but this is a laborious hand operation with an ordinary knife.

It is an object of this invention to provide a simple, inexpensively constructed instrument which will perform the above operations easily and effectively.

Further objects will be apparent in the course of the following detailed description.

In the drawing, wherein I have shown an illustrative embodiment of my invention, Fig. 1 is a top view of a device constructed in accordance with my invention;

Figure 1:
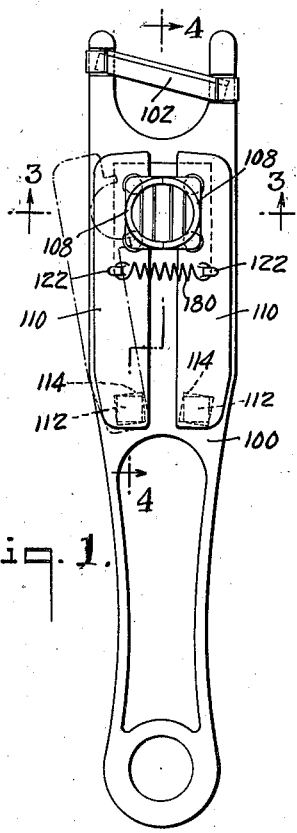

The instrument as shown comprises a handle member 100 forked at the end, where a topping blade 102 is clipped on. Transverse walls 104 extend down from the handle member which is cut out therebetween, and support a gang of slicing blades 106, which extend longitudinally of the handle member.

A pair of cup members 108 are positioned above the handle member. These cup members, which serve as bean guides, and are equipped with stringing blades, are carried by cup bases or arms 110. The gang of slicing knives is somewhat wider than the minimum opening of the cups, so that as the cup opening is increased it is still positioned over the gang of slicing knives. At the opposite ends from the cup members the cup bases are provided with square studs 112 which extend down through square holes 114 in the handle member. The holes 114 are slightly larger than the studs 112, and are disposed at slight angles thereto, each being rotated slightly outward at the cup side in relation to its stud. The arrangement is such that each cup base may pivot through a slight angle from an inward limit where its inner edge is aligned with the center of the handle member and its stud will turn no farther inwardly in its hole, to an outward limit where its cup member is about at the outer edge of the handle member and its stud will turn no farther outwardly in its hole.

Figure 2:
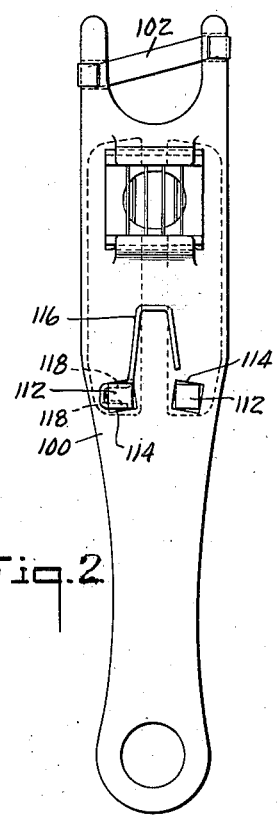
Fig. 2 is a bottom view thereof.
Figure 3:
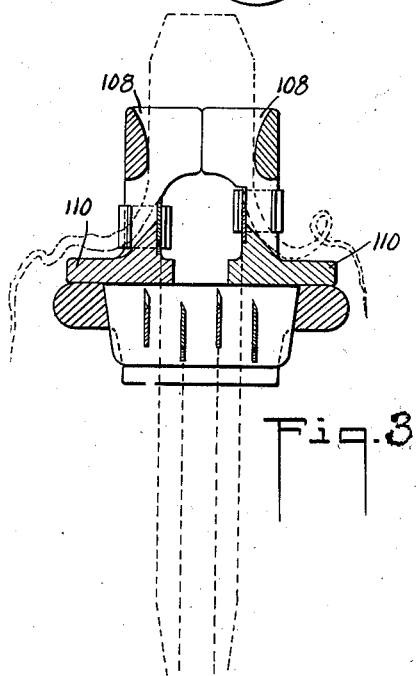
Fig. 3 is a section on the line 3—3 of Fig. 1.
Figure 4:
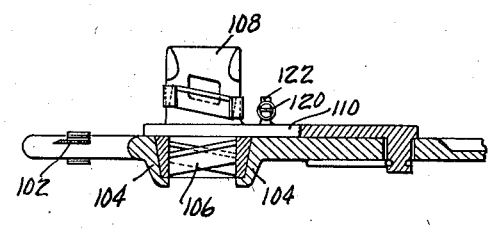
Fig. 4 is a section on the line 4—4 of Fig. 1.

Studs 112 are circumferentially grooved at 118, immediately beyond the lower face of the handle member. A spring clip 116 snaps around the projecting ends of the studs, holding them against withdrawal. This spring clip in its preferred form is shaped as a main U with a smaller U at each end thereof at right angles thereto, all three of the U's having their open sides facing a common point. This spring clip is clearly illustrated in Fig. 2. A light tension spring 120 fits over lugs 122 on the cup members and tends to draw them together.

The operation of the device will be apparent. The ends of a string bean are snipped off on the topping blade 102. The end of the bean is then pushed into the guide formed by the cup members, with the greater width of the bean extending transverse to the handle member.

The knives carried by the cup members cut the strings off of the bean, the cup members yielding to accommodate the varying thicknesses of the bean and give a constant-gauge stringing cut on each side. It will be noted that when the cups are not spread apart their inner faces meet along the center line of the instrument. Due to the relation of the studs and the holes, either cup member can yield outwardly but neither can move inwardly across the center line. Thus if the operator pushes the bean too hard to either side, that side will not jam or give a thick cut but will yield, and on the other hand the operator cannot have the entire cup displaced to the side, whereby the cup opening is always kept over the gang of slicing knives.

As the bean is pushed on down it is forced through the slicing knives. When it has been forced about half way through it is grasped below and pulled the rest of the way through.

While I have shown and described a preferred embodiment of my invention it is to be understood that its principles and characteristics may be embodied in other forms, and hence I wish to be limited only by the scope of the appended claims.

I claim:

1. In a bean trimming instrument a longitudinally extending handle member, an aperture therein, a gang of longitudinally extending slicing knives carried by said handle member and registering with said aperture, a pair of arms extending longitudinally of said handle member and carrying at one end longitudinally extending stringing blades registering with said aperture, non-circular lugs on the other ends of said arms, non-circular holes in said handle member into which said lugs loosely fit, the relation of the holes and lugs being such that the arms are allowed a limited amount of angular movement about the axes of the holes, the inner limit for each arm being where it abuts the other arm centrally of the handle member, said lugs extending through the handle member, and holding means engaging the projecting portions of the lugs.

2. Device of claim 1, in which the projecting portions of the lugs are provided with peripheral grooves just beyond the surface of the handle member, and a spring clip having two U-shaped ends facing each other and joined by a third U-shaped portion is sprung into said grooves.

3. In a bean trimming instrument a handle member, a pair of arms carrying guide cups, a pair of holes in said handle member, lugs on said arms extending through said holes, each lug being non-circular at its end adjacent the further side of the handle member and transversely grooved, and a single spring clip having backing engagement with the grooves of each lug and holding the same against withdrawal and at the same time yieldingly urging said lugs in a given angular position.

4. In a bean trimming instrument a handle member, a gang of slicing knives mounted on said handle member, a pair of cup bases, cup members carried thereby and located over the gang of slicing knives, non-circular lugs on said cup bases, non-circular holes in said handle member into which said lugs loosely fit, the relative size and shape of said lugs and said holes being such as allows a limited pivotal movement to each of said cup base members.

GERALD N. COUGHLAN.